United States Patent [19]

Ponzielli

[11] Patent Number: 4,973,406

[45] Date of Patent: Nov. 27, 1990

[54] DEVICE FOR THE SEPARATION OF PARTICULATED SOLIDS FROM A PRESSURIZED FLUID

[76] Inventor: Giuseppe Ponzielli, Via Panizzi, 12, Milano, Italy

[21] Appl. No.: 396,830

[22] Filed: Aug. 21, 1989

[30] Foreign Application Priority Data

Nov. 3, 1986 [IT] Italy ............................ 22216A/86

[51] Int. Cl.[5] ............................................ B01D 29/62
[52] U.S. Cl. .............................. 210/333.1; 210/340; 210/427; 425/197; 425/199; 137/625.32
[58] Field of Search .................. 210/108, 232, 333.01, 210/333.1, 340, 427; 55/273, 284; 137/239, 545, 625.32, 876; 425/197, 199

[56] References Cited

U.S. PATENT DOCUMENTS

| 276,820 | 5/1883 | Howes | 210/333.01 |
| 3,243,849 | 4/1966 | Joukaihen | 425/199 |
| 4,167,384 | 9/1979 | Shirato et al. | 425/199 |
| 4,486,304 | 12/1984 | Neuman et al. | 210/108 |

FOREIGN PATENT DOCUMENTS

| 614975 | 2/1961 | Canada | 210/333.01 |
| 684976 | 4/1964 | Canada | 425/199 |
| 2502669 | 5/1976 | Fed. Rep. of Germany . | |
| 50-3346 | 2/1975 | Japan | 425/199 |
| 50-35945 | 11/1975 | Japan | 425/199 |

Primary Examiner—W. Gary Jones
Assistant Examiner—Matthew O. Savage
Attorney, Agent, or Firm—Nies, Kurz, Bergert & Tamburro

[57] ABSTRACT

A device for the separation of particulated solids from a pressurized fluid, in particular from a viscous mass of a thermoplastic material, with a cleaning system for the filtration element based on the "return pressure" principle.

The device comprises a body having a fluid inlet conduit, two filtration assemblies that are connected to two conduits flowing together into an outlet conduit, and a flow-dividing valve that in rest position connects the inlet conduit with the separation conduits through the filtration assemblies, while in the cleaning position for one of the filtration assemblies the inlet conduit is connected with the other filtration assembly, thus causing part of the fluid that has been separated by this filtration assembly to pass with counterpressure through the filtration unit that is in the cleaning stage and through a discharge outlet housed in a compartment of the valve. In a similar manner the cleaning of the other filtration assembly is performed.

4 Claims, 4 Drawing Sheets

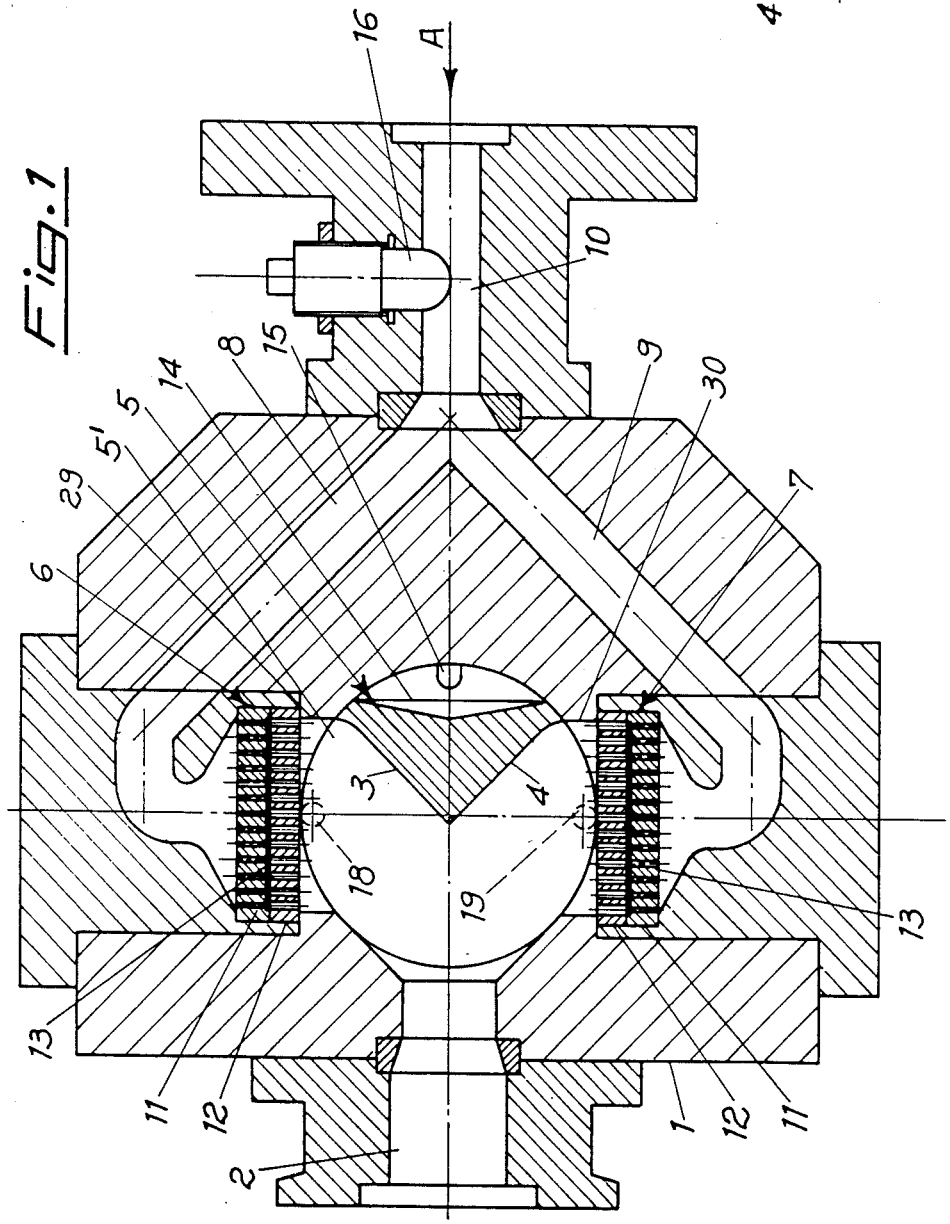

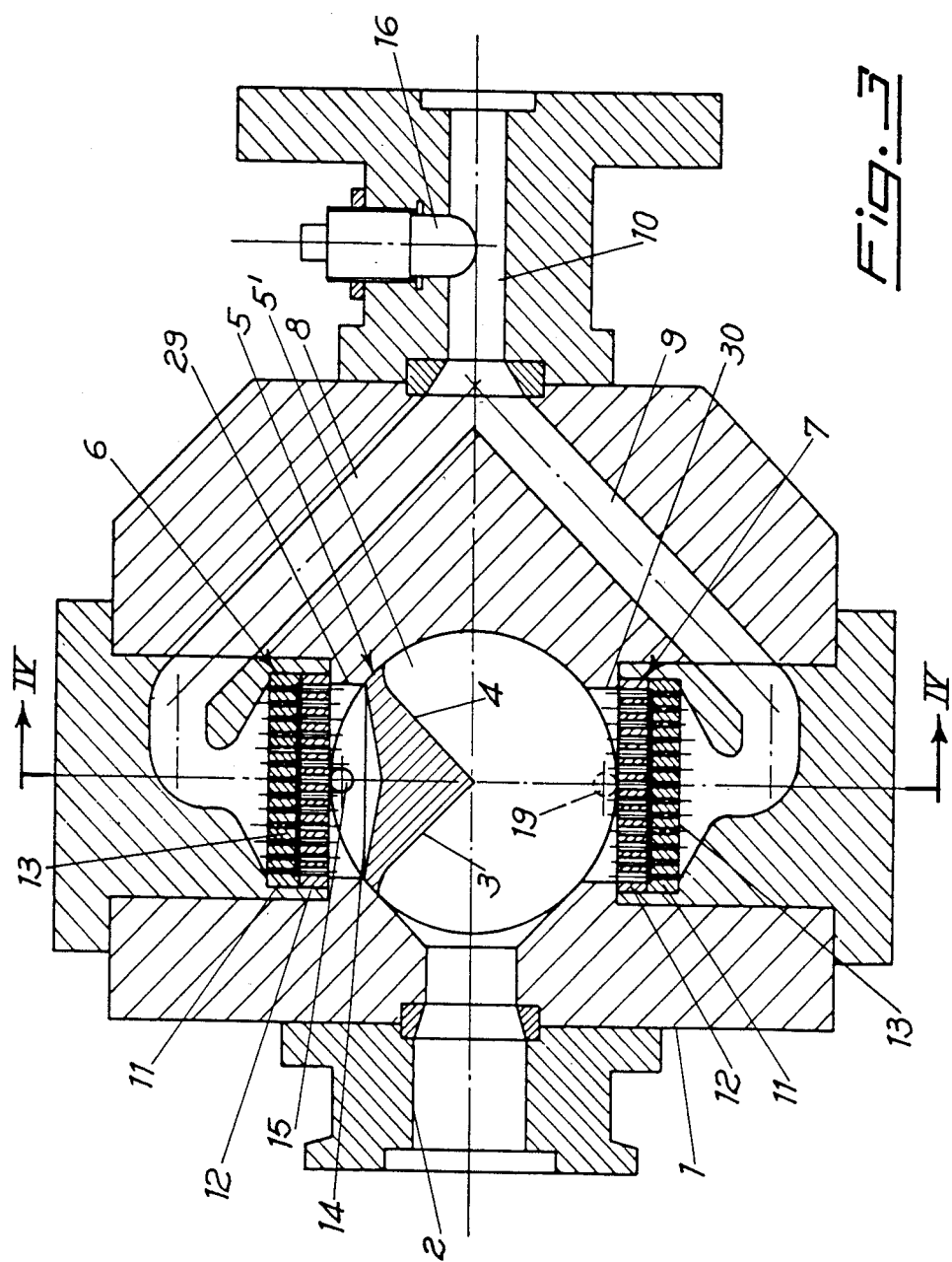

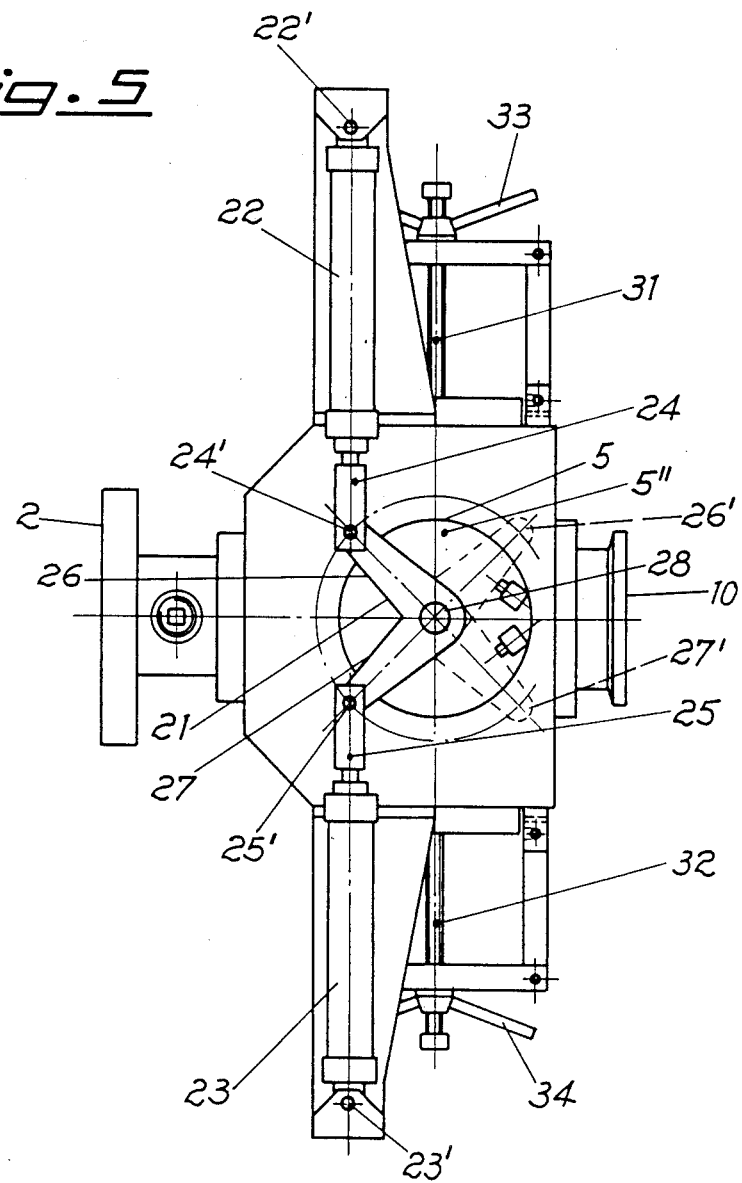

DEVICE FOR THE SEPARATION OF PARTICULATED SOLIDS FROM A PRESSURIZED FLUID

This application is a continuation of application Ser. No. 115,983, filed 11/2/87 now abandoned.

BACKGROUND OF THE INVENTION

The present invention mainly relates to a device for the separation of particulated solids from a pressurized fluid, in particular from a highly viscous mass of a thermoplastic material, to be implemented on machines for the extrusion of said materials.

It is well known that the filters provided on said devices are affected by gradual clogging due to the deposition of fouling particulated solids within the filters. Thus, after reaching a certain clogging level, it becomes necessary to clean said filters by means of the so-called "return pressure" principle.

Several patents have been published relating to this subject. German Patent No. 2 502 669 is to be considered as the most meaningful among them. Said patent teaches a device comprising a filtration assembly consisting of a circular foraminated throughput block in the interior of which the filter cloth is housed, said filter cloth being divided into a plurality of circular sectors, each of said circular sectors forming a throughput chamber that is tightly sealed against the remaining sectors. A rotary gate valve having a shape almost corresponding with that of a sector and the pivotal axis of which passes through the center-point of the circular throughput block is placed, in rest position, on a circular sector of the throughput block having no throughput holes. When the gate valve, suitably operated, turns a full 360° starting from the rest position and returning to the rest position, it passes in front of all the circular sectors of the block and tightly occludes them on the fluid inlet side for a very short time, thus causing the inlet-side pressure to drop. Since in the internal wall of the gate valve there is a conduit communicating with the outside, as the gate valve occludes a circular sector the amount of non filtered fluid that is in the depressurization chamber thus created between the gate valve and the throughput block is forcefully caused to flow outside through said outlet conduit, due to the pressure of the filtered fluid that is on the discharge side of the filtration block.

In this way, every time the gate valve passes in front of the circular sectors forming the filtration block the fouling particulated solids that, due to the delivery pressure, have accumulated on the wall of said block are eliminated with no substantial prejudice to the filtration flow.

Nevertheless, the devices that are based upon the above-mentioned German Patent show the following drawbacks:

The tight-seal gate valve, in the closing phase of every circular sector, can meet fouling particles, like iron, wood or other particles, that hinder a perfect closing due to the interposition of said particles between the wall of the stationary sector and the rotary wall of the gate valve; this results in a jamming of the sector.

The device necessarily operates with a high pressure on the discharge side of the filter, due to the following reasons:

(1) Since the gate valve is moving, the time it closes a circular sector is practically infinitesimal, therefore it is necessary to compensate the quite short depressurization by increasing the pressure on the discharge side of the filter, also taking into account the delay of return response of the fluid, due to its elasticity.

(2) The pressure on the discharge side of the filter must also be kept high to compensate for the high pressure drop the fluid undergoes because it passes through an outlet conduit that is necessarily long and tortuous. This high pressure on the discharge side of the filter not only causes an expensive increase in the energy consumption, but in certain cases an over-pressure is not even allowed due to the nature of the fluid to be filtered and, in other cases, typically in the field of thermoplastic materials, it is incompatible with other situations of the system that demand the process to be carried out below a certain critical pressure. A typical example is offered by extrusion with degassing where, by exceeding such a critical pressure, the fluid is caused to flow back and come out of the degassing valve.

The flow capacity of the device according to the above-mentioned Patent is seriously affected by the diameter of the throughput - filtration block. In fact, since the discharge outlet in the internal wall of the gate valve is located nearby the center of the block and is therefore in an opposite position relative to the circumferential periphery of the filtration block, excessively enlarging its diameter for the purpose of increasing its flow capacity would lead to having an excessive distance between the circumferential periphery and the discharge point, with serious deviations of the outlet flow and alteration of the homogeneity of discharge.

SUMMARY OF THE INVENTION

It is an object of the present invention to eliminate the above-mentioned drawbacks by providing a device providing the following advantages:

It makes it possible to increase to the maximum level the flow capacity of the filter with a double filtration area.

It provides a "return pressure" purification system that acts simultaneously on the whole area of the filtration element by conveying the discharge material without deviation of the outlet flow.

It provides a minimal operating pressure on the discharge side of the fiter by pressurizing-depressurizing the whole filter simultaneously during the whole time of a few seconds corresponding to the purging cycle and causing the return fluid during discharge to undergo a minimal head loss thanks to a suitable configuration of the conduit.

It is another object of the present invention to provide a highly reliable, functional device that can be built at a low cast and does not require frequent maintenance.

These and other objects are all achieved by the subject device, that is characterized in that it comprises a fluid inlet conduit, two filtration assemblies communicating with two separation conduits that flow together into an outlet conduit, and a valve that is so shaped that when the valve is in the rest position the fluid entering through the inlet conduit passes through the filtration assemblies and along said two separation conduits, while, when the valve is moved into a position corresponding with and tightly closing the first filtration assembly, the return pressure fluid that is being discharged passes through said filtration assembly, said pressurized fluid being derived from at least part of the fluid that has been separated by the second filtration assembly and, similarly, when the valve is moved into a position corresponding with and tightly closing the second filtration assembly, the return pressure fluid that is being discharged passes through said filtration assembly, said pressurized fluid being derived from at least part of the fluid that has been separated by the first filtration assembly.

DESCRIPTION OF THE DRAWINGS

The features and advantages of the invention will be evident from the following detailed description of a preferred non-limiting embodiment of the subject device taken in conjunction with the accompanying drawings, in which:

FIG. 1 is a horizontal cross-sectional view of the device according to the present invention;

FIG. 2 is a view of the valve of the device according to the present invention taken along arrow A of FIG. 1;

FIG. 3 is a horizontal cross-sectional view of the device according to the present invention with the valve in one of the two positions in which the pressurized fluid is caused to flow back;

FIG. 5 is a top view of the driving members of the valve.

DESCRIPTION OF THE PREFERRED EMBODIMENT

Figure 4:
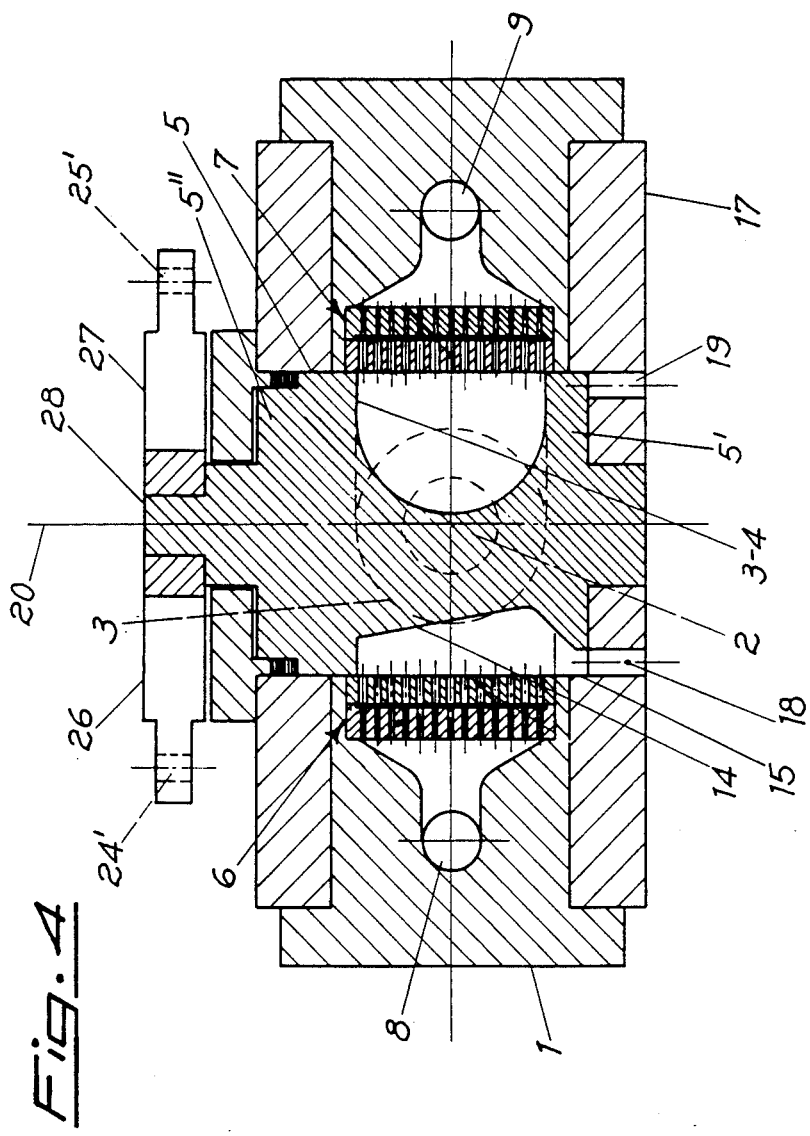
FIG. 4 is a cross-sectional view of the device taken along the line IV—IV of FIG. 3.

Referring now to FIGS. 1 and 2, the body 1 of the device comprises an inlet conduit 2 through which the pressurized fluid passes, said fluid being in particular a molten, highly viscous mass of a thermoplastic material passing through the communicating first and second chambers 3 and 4 of a cylindrical rotary valve 5. When said valve 5 is in the position of FIG. 1, the fluid passes through the filtration assemblies 6 and 7 and then through two separation conduits 8 and 9 that flow into the same outlet conduit 10. The filtration assemblies 6 and 7 both consist of foraminated plates 11 and 12 and filtration elements 13, normally wire meshes or foraminated metal sheets.

Valve 5 comprises, besides the chambers 3 and 4, a third chamber 14 that ends with an outlet 15 that is in a lower position than said opening, whilst at the outlet conduit 10 there is provided a flow-rate control valve. Valve 5 includes a pair of opposed, spaced ends 5' and 5".

As can be seen from FIGS. 1 and 4, the lower closing plate 17 of body 1 includes two holes 18 and 19 on opposite sides relative to the axis 20 of valve 5 and facing the filtration assemblies 6 and 7 respectively.

FIG. 5 shows the device 21, that is suitable to cause the cylindrical valve 5 to rotate around axis 20 for it to reach the two cleaning positions for said filtration assemblies 6 and 7. Said device 21 comprises two hydraulic rams 22 and 23 that are hinged in 22' and 23' respectively, the pistons of which are secured to stems 24 and 25, respectively hinging in 24' and 25' around arms 26 and 27 which, in turn, are rigidly connected with the hub 28 of valve 5.

When cylinder 22 is actuated, stem 24 causes the arm 27 to rotate into the phantom position 27' and valve 5 is caused to rotate into the position shown in FIGS. 4 and 5, thus bringing the opening 14 to tightly face the inlet 29 of the filtration assembly 6, that is in the cleaning position of said filtration assembly 6, as will be described in more details below. After stopping for a while, the cylinder 22 causes the arms 26 and 27 to return to the original position together with valve 5, thereafter cylinder 23 is operated and its piston-rod 25 causes the arm 26 to rotate into the phantom position 26' and in this position of valve 5 the opening 14 tightly faces the inlet 30 of the filtration assembly 7, for the cleaning thereof.

As can be seen in FIG. 5, there are provided two shafts 31 and 32 that can be operated by hand by means of handle-bars 33 and 34, said shafts being connected with the filtration assemblies 6 and 7 respectively for their removal from the working seat when they have to be maintained or replaced.

The device of the present invention works in the following manner:

When valve 5 is in the position shown in FIG. 1, the pressurized fluid enters through the inlet conduit 2 and is distributed by chambers 3 and 4 through inlet 29 and 30 to the filtration assemblies 6 and 7, and, after having been cleaned of the fouling particles, it flows through the separation conduits 8 and 9, eventually flowing together in the outlet conduit 10.

When, due to the gradual clogging of the filtration assemblies 6 and 7, which in turn is due to the deposition of fouling solid particles, a certain critical preset pressure is reached on the inlet side of the filtration assemblies 6 and 7, said pressure being suitably measured by a pressure gauge, not shown in the figures, the hydraulic rams 22 and 23 are alternatively and successively actuated, thus causing the valve 5 to rotate into the above-mentioned positions. When the valve 5 is in the position shown in FIGS. 3 and 4, outlet 15 is superimposed on hole 18 so that the fluid entering through the inlet conduit 2 passes through the filtration assembly 7 and the separation conduit 9 and is then divided into a stream going through the outlet conduit 10 and another stream flowing through the separation conduit 8 with a return pressure on the discharge side of the filtration assembly 6. In this condition opening 14 becomes a depressurization chamber due to the pressure difference thus created between the fluid on the discharge side of the filtration assembly 6 and the outlet 15, thereby eliminating through the outlet 15 all the fouling particulated solids deposited on the walls of the filtration assembly 6, with no substantial prejudice to the filtration flow through the other filtration assembly 7. Evidently, the control valve 16 is used to exactly control the return flow rate through outlet 15, and the dwelling time of the opening 14 in front of the filtration assembly 6 is adjustable.

At the end of said dwelling time, cylinder 22 causes the valve 5 to return into the original position, while cylinder 23 is actuated to carry out a similar cleaning operation of the filtration assembly 7. Thereby, part of the pressurized fluid that has been filtered by the filtration assembly 6 reaches the discharge side of the filtration assembly 7 thereby building up a counter pressure, so that opening 14 becomes a depressurization chamber thanks to the pressure difference thus created between fluid that is on the discharge side of the filtration assembly 7 and the outlet 15, now superimposed on hole 19.

It is to be understood that various changes can be brought into the described embodiment without departing from the scope of the invention. For example, the hydraulic rams 22 and 23 can be substituted by equivalent mechanical members suitable to cause valve 5 to rotate into the above-mentioned positions without departing from the scope of the present invention as it is defined in the following claims.

It can moreover be especially useful to connect holes 18 and 19 to a small screw-extruder so that, when said screw is still-standing, no purge material gets out, whilst by changing the r.p.m. of said extruder the flow-rate of the purge material can be controlled, said purge material being suitably granulated by a suitable cutting system provided on the head of said extruder.

Finally, chambers 3 and 4 of the cylindrical valve 5 can be suitably connected with each-other by providing a channel on the periphery of said valve above opening 14 in such a way that said channel does not interfere with said opening. With this embodiment the benefit is obtained that the fluid pressure is uniform, thereby relieving any stress on valve due to the thrust of the fluid mass pressing said valve against its seat, said fluid coming from the inlet conduit 2. Also the risk is avoided that the fluid, that consists of molten polymer, stops in the chambers that divide the flow into streams to the filtration assemblies 6 and 7, due to the fact that the fluid is forcefully caused to continuously flow through said channel.

I claim:

1. A device for the separation of particulate solids from a pressurized fluid, comprising: a housing having a fluid inlet conduit; first and second filtration assemblies each in communication with a respective separation conduit, each separation conduit in continuous flow communication with the other and joined together to communicate with an outlet conduit, each of said filtration assemblies being provided with outer and inner plates, a rotary valve member having a longitudinal axis and a cylindrical surface provided with two opposed, spaced ends perpendicular to the valve longitudinal axis around which the valve member is rotated, said valve member defining with an inner surface of the housing first and second contiguous chambers and a third chamber separate from the first and second chambers, said third chamber being in direct flow communication with an outlet located in one end of said valve member, each inner plate having an inlet facing the valve member, the valve member adapted to be rotated so as to selectively place said first, second and third chambers into flow communication with a respective one of the filter assemblies so that when the valve member is in a first, intermediate position the fluid entering through the inlet conduit flows into only the first and second chambers and enters said inner plates of each of the filter assemblies and then flows through each of the respective separation conduits to the outlet conduit, and when the valve member is rotated into a second position so that said third chamber is opposite the inlet of the inner plate of said first filtration assembly, fluid flowing from said second filtration assembly passes through the outer and inner plates of said first filtration assembly in a reverse flow direction and discharges through said outlet, and when the valve member is rotated into a third position so that said third chamber is opposite the inlet of the inner plate of said second filtration assembly, fluid flowing from said first filtration assembly passes through the outer plate of said second filtration assembly in a reverse flow direction and discharges through said outlet.

2. A device as claimed in claim 1, including a closing plate positioned against said one end of the valve member, said closing plate having two spaced holes for separate communication with said outlet when the valve member is rotated to provide communication between said third chamber and a respective one of the filtration assemblies.

3. A device as claimed in claim 2, wherein said outlet conduit includes a flow control valve to control the flow rate of filtered fluid through said third chamber and said outlet.

4. A device as claimed in claim 1, including valve member actuating means at the other end of the valve member, said actuating means including hydraulic ram means connected with two arms drivingly connected to rotate the valve member to shift the first, second, and third chambers relative to the filtration assemblies.

* * * * *